United States Patent
Miller et al.

(10) Patent No.: US 10,145,255 B2
(45) Date of Patent: Dec. 4, 2018

(54) CONSTANT SPEED 2 PIECE RING SEAL ARRANGEMENT

(71) Applicant: United Technologies Corporation, Farmington, CT (US)

(72) Inventors: Jonathan Logan Miller, Ware, MN (US); Colin D. Craig, West Hartford, MN (US)

(73) Assignee: United Technologies Corporation, Farmington, CT (US)

( * ) Notice: Subject to any disclaimer, the term of this patent is extended or adjusted under 35 U.S.C. 154(b) by 9 days.

(21) Appl. No.: 15/405,376

(22) Filed: Jan. 13, 2017

(65) Prior Publication Data
US 2018/0202304 A1    Jul. 19, 2018

(51) Int. Cl.
| *F16J 15/34* | (2006.01) |
| *F01D 11/00* | (2006.01) |
| *F16J 15/16* | (2006.01) |
| *F16J 15/30* | (2006.01) |
| *F16J 15/44* | (2006.01) |

(52) U.S. Cl.
CPC .............. *F01D 11/003* (2013.01); *F16J 15/16* (2013.01); *F16J 15/30* (2013.01); *F16J 15/441* (2013.01); *F05D 2220/32* (2013.01); *F05D 2240/60* (2013.01); *F05D 2250/182* (2013.01); *F05D 2260/52* (2013.01)

(58) Field of Classification Search
CPC .......... F16J 15/16; F16J 15/34; F01D 11/003; F05D 2220/32; F05D 2240/60; F05D 2260/52
See application file for complete search history.

(56) References Cited

U.S. PATENT DOCUMENTS

| 3,784,213 | A  | * | 1/1974  | Voitik ..................... | F16J 15/348 |
|           |    |   |         |                              | 277/373 |
| 7,311,307 | B2 | * | 12/2007 | Dahlheimer ............. | F16J 15/38 |
|           |    |   |         |                              | 277/370 |
| 7,370,864 | B2 | * | 5/2008  | Azibert ................ | F16J 15/3404 |
|           |    |   |         |                              | 277/358 |
| 7,793,940 | B2 | * | 9/2010  | Martin ................. | F16J 15/3496 |
|           |    |   |         |                              | 277/370 |
| 2002/0096834 | A1 | * | 7/2002 | Hadley .................. | F16J 15/348 |
|           |    |   |         |                              | 277/358 |

(Continued)

FOREIGN PATENT DOCUMENTS

| EP | 3048343 A1 | 7/2016 |
| WO | WO-2015065731 A1 * | 5/2015 ............ F01D 11/003 |

OTHER PUBLICATIONS

Extended European Search Report for EP Application No. 18151059. 5, dated Jun. 28, 2018, 7 pages.

*Primary Examiner* — Gilbert Y Lee
(74) *Attorney, Agent, or Firm* — Kinney & Lange, P.A.

(57) ABSTRACT

A carbon ring for a seal assembly in a gas turbine engine includes an outer face extending circumferentially around a center axis of the carbon ring. The carbon ring also includes an inner face extending around the center axis and disposed radially inward from the outer face. A forward face of the carbon ring extends radially between the inner face and the outer face. A rear face of the carbon ring extends radially between the inner face and the outer face and is disposed axially opposite the forward face. At least one tab extends axially from at least one of the forward face and the rear face.

16 Claims, 5 Drawing Sheets

(56) References Cited

U.S. PATENT DOCUMENTS

| | | | |
|---|---|---|---|
| 2004/0026868 A1* | 2/2004 | Dahlheimer | F16J 15/348 |
| | | | 277/352 |
| 2007/0085278 A1* | 4/2007 | Davis | F01D 25/183 |
| | | | 277/411 |
| 2008/0237995 A1* | 10/2008 | Khonsari | F16J 15/3404 |
| | | | 277/390 |
| 2009/0184475 A1* | 7/2009 | Dobek | F16J 15/3404 |
| | | | 277/500 |
| 2013/0038023 A1* | 2/2013 | Kirchhof | F16J 15/3468 |
| | | | 277/358 |
| 2015/0369367 A1 | 12/2015 | Kuroki | |
| 2016/0010483 A1 | 1/2016 | Miller | |

* cited by examiner

CONSTANT SPEED 2 PIECE RING SEAL ARRANGEMENT

BACKGROUND

The present disclosure relates to gas turbine engines, and more specifically to seals for use in turbine sections of gas turbine engines.

Carbon seal assemblies are used in gas turbine engines between rotating shafts and static frames, and between two rotating shafts. Carbon seal assemblies maintain lubricating fluids within a bearing compartment or bearing chamber and seal against hot air intrusion or cooling air leakage. Some carbon seal assemblies include multiple carbon rings stacked axially against one another. During engine operation, these carbon rings can rotate against one another and against adjacent seats, causing the carbon rings to wear unevenly and prematurely.

SUMMARY

In one embodiment, a carbon ring for a seal assembly in a gas turbine engine includes an outer face extending circumferentially around a center axis of the carbon ring. The carbon ring also includes an inner face extending around the center axis and disposed radially inward from the outer face. A forward face of the carbon ring extends radially between the inner face and the outer face. A rear face of the carbon ring extends radially between the inner face and the outer face and is disposed axially opposite the forward face. At least one tab extends axially from at least one of the forward face and the rear face.

In another embodiment, a seal assembly for a gas turbine engine includes an annular front seat positioned on a center axis of the seal assembly and an annular rear seat disposed axially aft of the annular front seat. A first carbon ring is positioned axially between the annular front seat and the annular rear seat. A second carbon ring is positioned axially between the first carbon ring and the annular rear seat. The first carbon ring rotationally interlocks with the second carbon ring.

In another embodiment, a seal assembly for a gas turbine engine includes an annular front seat positioned on a center axis of the seal assembly and an annular rear seat disposed axially aft of the annular front seat. A first carbon ring is positioned axially between the annular front seat and the annular rear seat. A second carbon ring is positioned axially between the first carbon ring and the annular rear seat. The first carbon ring rotationally interlocks with the second carbon ring.

Persons of ordinary skill in the art will recognize that other aspects and embodiments are possible in view of the entirety of the present disclosure, including the accompanying figures.

Figure 1:
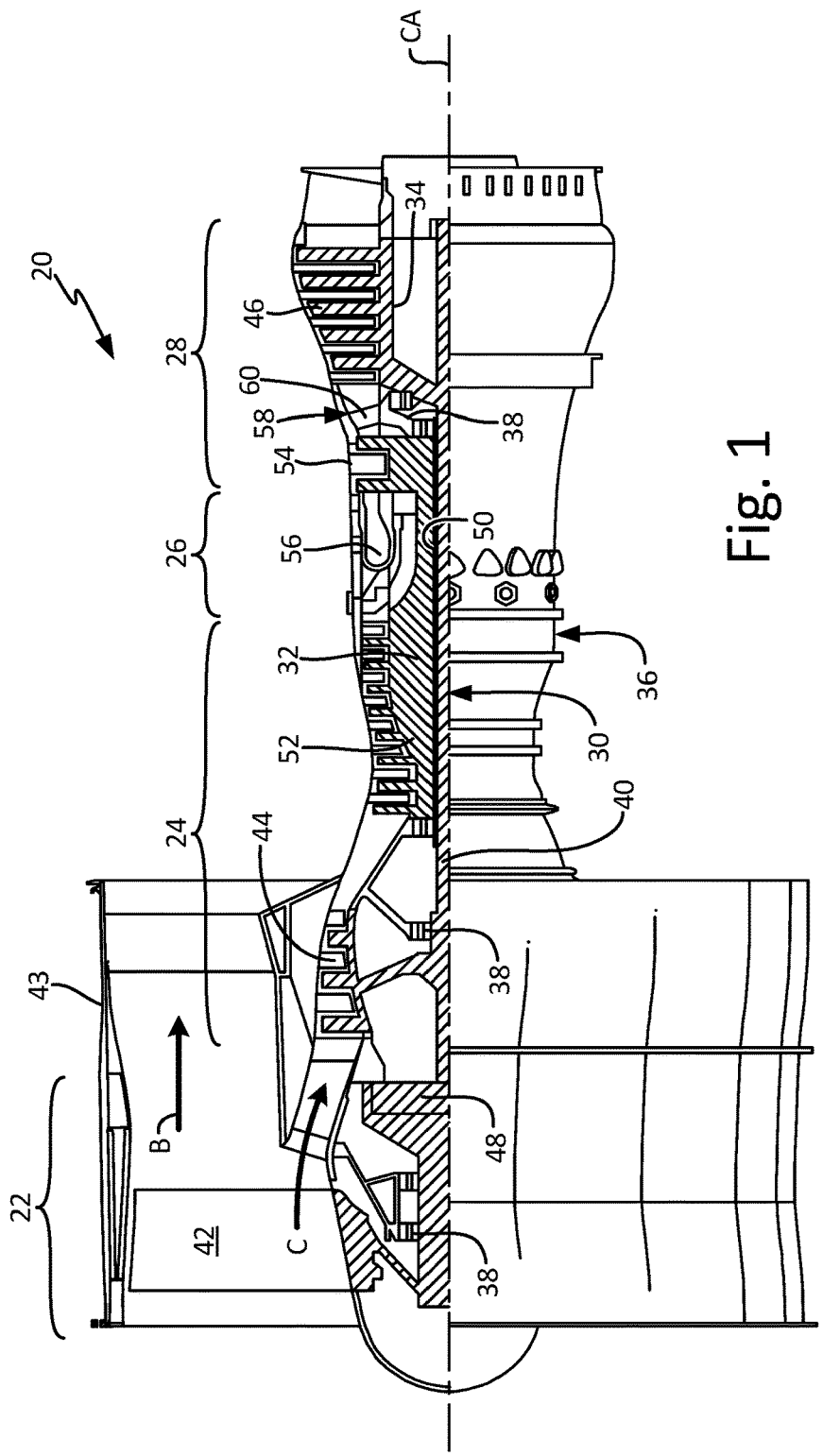
FIG. 1 is a partial cross-sectional view of a gas turbine engine.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a seal assembly for use in a gas turbine engine between two rotating shafts or between a rotating shaft and a static structure. The seal assembly includes two carbon rings stacked together along a center axis between a front seat and a rear seat. The two carbon rings can rotate about the center axis and can rotate relative the front seat, the rear seat, and any surrounding structure. The two carbon rings interlock with each other such that the two carbon rings do not rotate relative to one another. A spring can be disposed between the two carbon rings to bias one ring against the front seat and to bias the second ring against the rear seat. Because the two carbon rings interlock with each other, the two carbon rings wear more evenly and do not wear out the spring. Furthermore, the two rings can be symmetrical to each other so that two copies of a single part can be used for the two rings, thereby reducing manufacturing complexity and cost of the seal assembly.

FIG. 1 is a quarter-sectional view that schematically illustrates example gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example gas turbine engine 20 generally includes low speed spool 30 and high speed spool 32 mounted for rotation about center axis CA of gas turbine engine 20 relative to engine static structure 36 via several bearing assemblies 38. It should be understood that various bearing assemblies 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing assemblies 38 about center axis CA.

Figure 2:
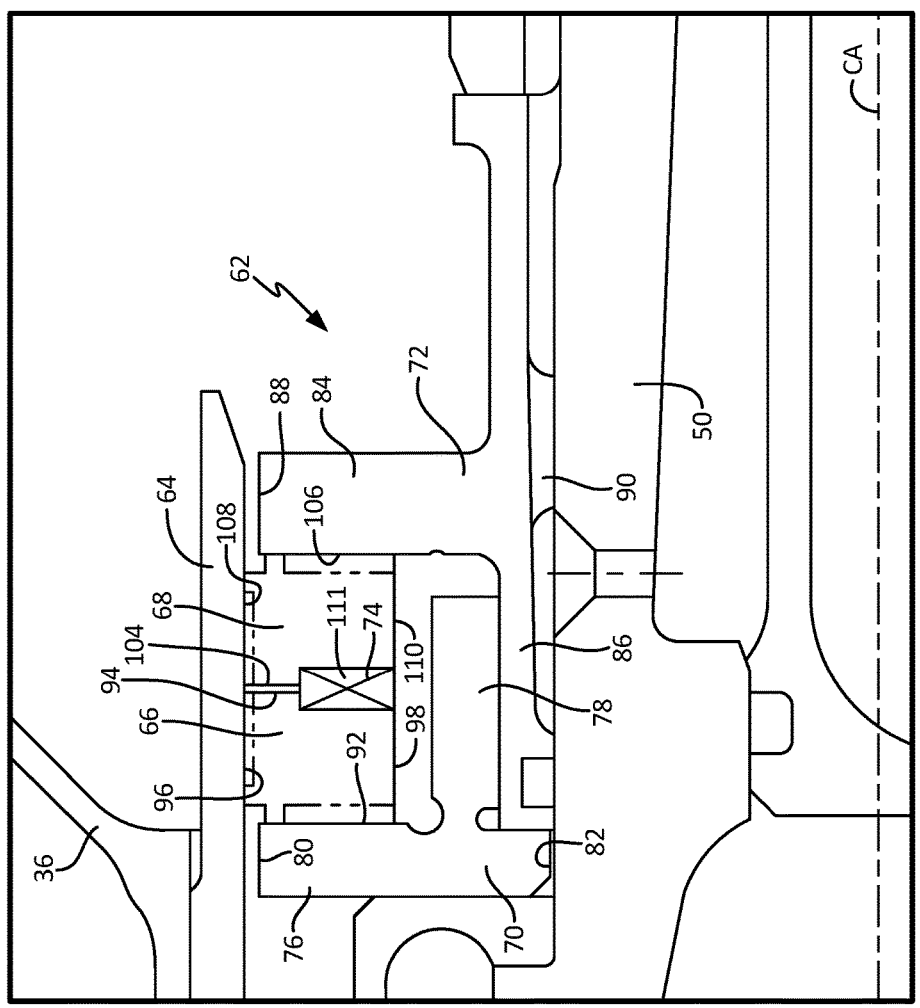
FIG. 2 is a cross-sectional view of a static structure, seal assembly, and shaft of the gas turbine engine from FIG. 1.

Combustor 56 is arranged between high pressure compressor 52 and high pressure turbine 54. Mid-turbine frame 58 of engine static structure 36 can be arranged generally between high pressure turbine 54 and low pressure turbine 46. Mid-turbine frame 58 further supports bearing assemblies 38 in turbine section 28 as well as setting airflow entering the low pressure turbine 46. Mid-turbine frame 58 includes vanes 60, which are in the core airflow path and function as an inlet guide vane for low pressure turbine 46. The core airflow C is compressed first by low pressure compressor 44 and then by high pressure compressor 52 mixed with fuel and ignited in combustor 56 to produce high speed exhaust gases that are then expanded through high pressure turbine 54, mid-turbine frame 58, and low pressure turbine 46. As shown in FIG. 2, gas turbine engine 20 includes seal assembly 62 to reduce or eliminate air and fluid leakage between static structure 36 and outer shaft 50.

FIG. 2 is a cross-sectional view of static structure 36, outer shaft 50, and seal assembly 62 of gas turbine engine 20 shown in FIG. 1. As shown in FIG. 2, seal assembly 62 includes seal static liner 64, first carbon ring 66, second carbon ring 68, front seat 70, rear seat 72, and springs 74 (only one of which is shown in FIG. 2). Front seat 70 includes radial segment 76, axial segment 78, outer surface 80, and inner surface 82. Rear seat 72 includes radial segment 84, axial segment 86, outer surface 88, and inner surface 90. First carbon ring 66 includes first forward face 92, first rear face 94, first outer face 96, and first inner face 98. Second carbon ring 68 includes second forward face 104, second rear face 106, second outer face 108, and second inner face 110. Spring cavity 111 is formed between first carbon ring 66 and second carbon ring 68.

Seal assembly 62 is disposed radially between static structure 36 and outer shaft 50 relative to center axis CA. Seal static liner 64 is connected to static structure 36 such that seal static liner 64 does not rotate about center axis CA. Seal static liner 64 extends circumferentially around first carbon ring 66 and second carbon ring 68. First carbon ring 66, second carbon ring 68, front seat 70, and rear seat 72 are positioned radially between seal static liner 64 and outer shaft 50.

Front seat 70 is annular and connected to outer shaft 50 such that front seat 70 rotates with outer shaft 50 during operation of gas turbine engine 20. Radial segment 76 of front seat 70 extends radially from outer surface 80 of front seat 70 to inner surface 82 of front seat 70. Axial segment 78 of front seat 70 extends axially aftward from radial segment 76 of front seat 70 and is positioned radially between outer surface 80 and inner surface 82 of front seat 70.

Rear seat 72 is also annular and connected to outer shaft 50 such that rear seat 72 rotates with outer shaft 50 during operation of gas turbine engine 20. Radial segment 84 of rear seat 72 is positioned axially aft of radial segment 76 of front seat 70 and extends radially from inner surface 90 of rear seat 72 to outer surface 88 of rear seat 72. Axial segment 86 of rear seat 72 extends axially forward from radial segment 84 of rear seat 72. As shown in FIG. 2, axial segment 78 of front seat 70 can overlap axial segment 86 of rear seat 72 such that axial segment 86 is disposed radially inward of axial segment 78. When stacked together, axial segment 86 of rear seat 72 spaces radial segment 76 of front seat 70 from radial segment 84 of rear seat 72 so as to accommodate first carbon ring 66 and second carbon ring 68 between radial segment 76 and radial segment 84.

First carbon ring 66 is disposed axially between radial segment 76 of front seat 70 and radial segment 84 of rear seat 72. First carbon ring 66 extends radially between first outer face 96 and first inner face 98, and extends axially between first forward face 92 and first rear face 94. First outer face 96 of first carbon ring 66 is in contact with seal static liner 64 and first forward face 92 of first carbon ring 66 is in contact with radial segment 76 of front seat 70.

Second carbon ring 68 is disposed axially between first carbon ring 66 and radial segment 84 of rear seat 72. Second carbon ring 68 extends radially between second outer face 108 and second inner face 110, and extends axially between second forward face 104 and second rear face 106. Second forward face 104 of second carbon ring 68 faces first rear face 94 of first carbon ring 66. Second outer face 108 of second carbon ring 68 contacts seal static liner 64. Second rear face 106 of second carbon ring 68 contacts radial segment 84 of rear seat 72.

Spring cavity 111 is formed between first carbon ring 66 and second carbon ring 68. As shown in FIG. 2, spring cavity 111 extends axially forward into first carbon ring 66 and axially through first rear face 94 of first carbon ring 66. Spring cavity 111 also extends axially aftward into second carbon ring 68 and axially through second forward face 104 of second carbon ring 68. Spring cavity 111 can extend fully around an inner circumference of first carbon ring 66 and second carbon ring 68. Springs 74 are disposed inside spring cavity 111 to bias first carbon ring 66 forward and against front seat 70, and to bias second carbon ring 68 aftward against rear seat 72. Springs 74 extend axially between first carbon ring 66 and second carbon ring 68 and can be wave springs, coil springs, or any other kind of springs that are capable of fitting within spring cavity 111 and surviving the thermal environment of seal assembly 62 while exerting the necessary load between first carbon ring 66 and second carbon ring 68. Springs 74 can also include combinations of the above-described springs. For example, springs 74 can include wave springs and coil springs in the same assembly. Each of springs 74 can be disposed between a pair of flat washers (not shown) inside spring cavity 111. The flat washers reduce wear between springs 74 and first carbon ring 66 and second carbon ring 68.

During operation of gas turbine engine 20, first carbon ring 66 and second carbon ring 68 are in contact with seal static liner 64 and are free to rotate relative seal static liner 64 so as to reduce stress and wear on first carbon ring 66 and second carbon ring 68. First carbon ring 66 and second carbon ring 68 are also free to rotate relative to front seat 70 and rear seat 72 to reduce stress on first carbon ring 66 and second carbon ring 68. As discussed below with reference to FIGS. 3A-3C, first carbon ring 66 interlocks with second carbon ring 68 such that first carbon ring 66 and second carbon ring 68 rotate together about center axis CA and not independent of one another.

Figure 3A:
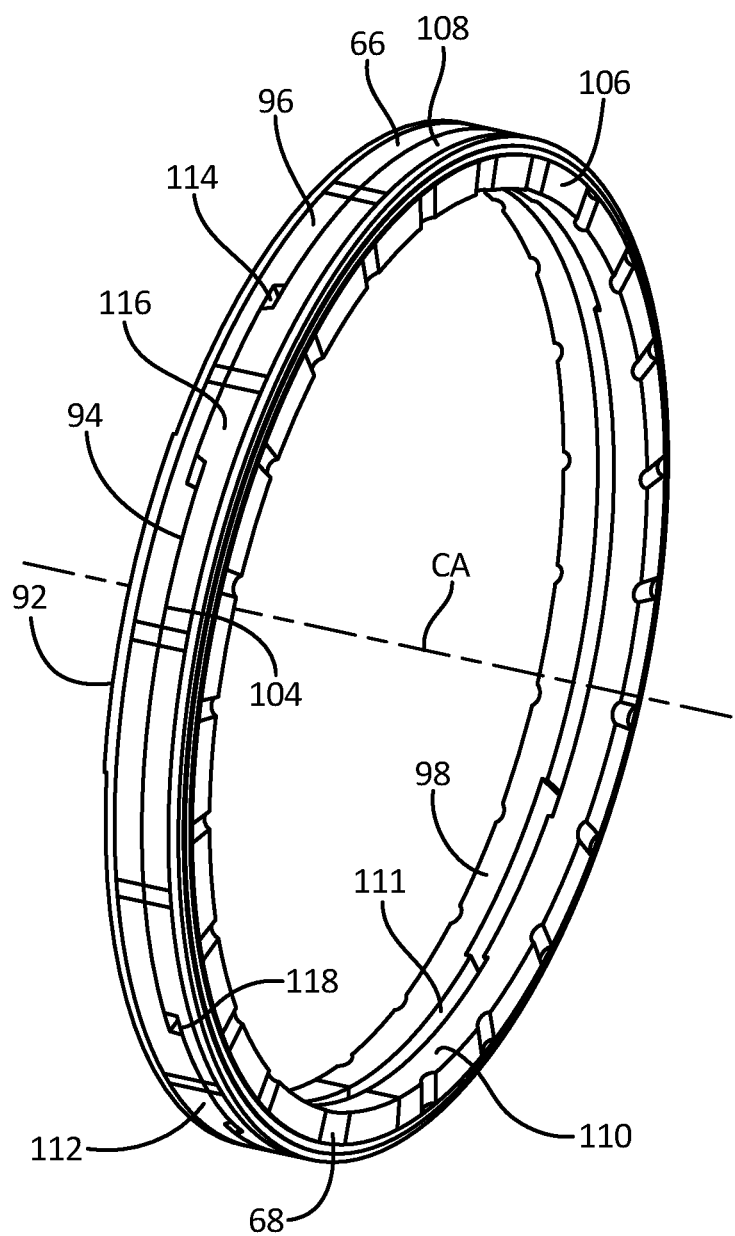
FIG. 3A is a perspective view of two carbon rings from the seal assembly from FIG. 2.
Figure 3B:
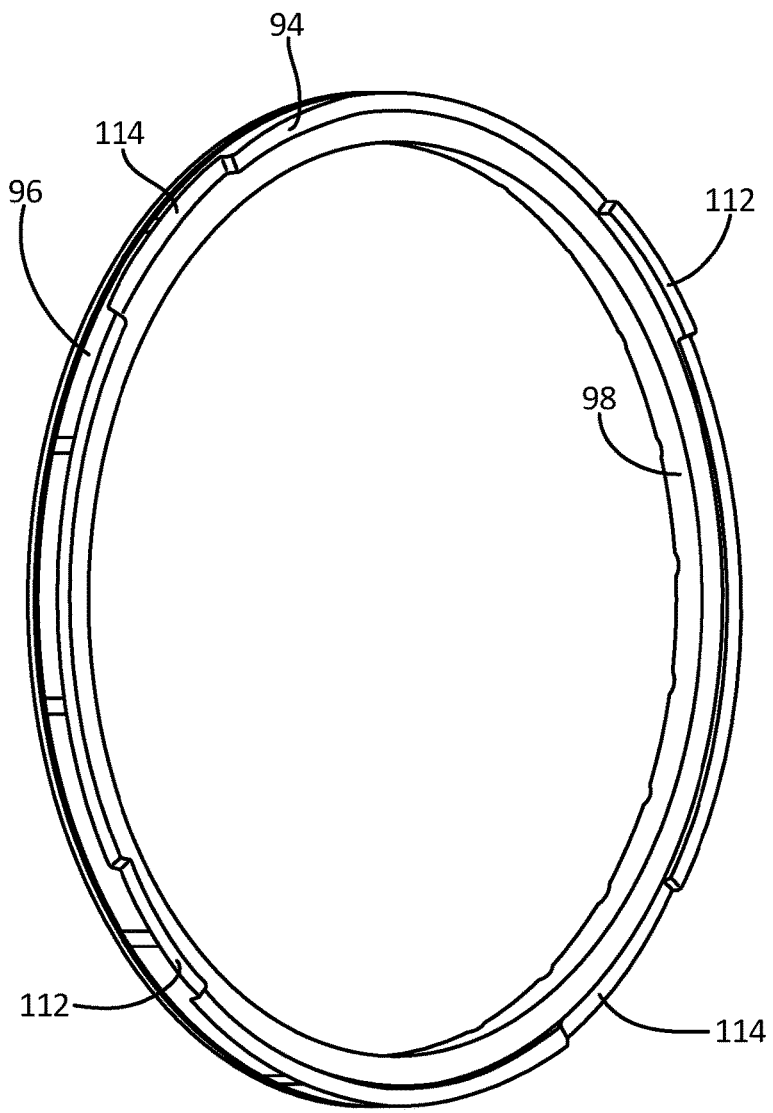
FIG. 3B is a perspective view of one of the carbon rings from FIG. 3A.
Figure 3C:
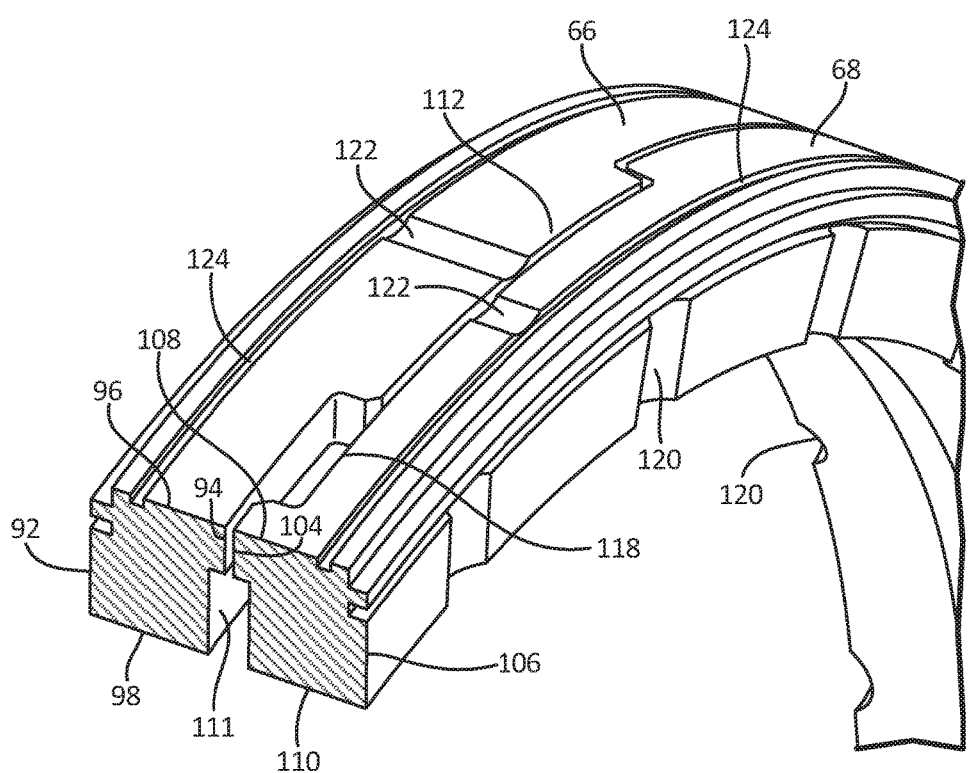
FIG. 3C is a perspective cross-sectional view of the two carbon rings from FIG. 3A.

FIG. 3A is a perspective view of first carbon ring 66 and second carbon ring 68 from seal assembly 62 in FIG. 2. FIG. 3B is a perspective view of first carbon ring 66 and FIG. 3C is a perspective cross-sectional view of first carbon ring 66 and second carbon ring 68 from FIG. 3A. As shown in FIGS. 3A-3C, first carbon ring 66 includes first tabs 112 and first slots 114, and second carbon ring 68 includes second tabs 116 and second slots 118.

First tabs 112 extend axially from first rear face 94 of first carbon ring 66, and are radially positioned proximate first outer face 96 of first carbon ring 66. First slots 114 extend axially into first rear face 94 of first carbon ring 66 at first outer face 96. In the embodiment of FIGS. 3A-3C, first carbon ring 66 includes two first tabs 112 and two first slots 114. In other embodiments, first carbon ring 66 can include a different number of first tabs 112 and first slots 114 than shown in FIGS. 3A-3C. first tabs 112 and first slots 114 are arranged circumferentially on first rear face 94 of first carbon ring 66 in alternating fashion such that one of first slots 114 is disposed circumferentially between two first tabs 112.

Second tabs 116 extend axially forward from second forward face 104 of second carbon ring 68, and are radially positioned proximate second outer face 108 of second carbon ring 68. Second slots 118 extend axially rearward into second forward face 104 of second carbon ring 68 at second outer face 108. In the embodiment of FIGS. 3A-3C, second carbon ring 68 includes two second tabs 116 and two second slots 118. In other embodiments, second carbon ring 68 can include a different number of second tabs 116 and second slots 118 than shown in FIGS. 3A-3C. Second tabs 116 and second slots 118 are arranged circumferentially on second forward face 104 of second carbon ring 68 in alternating fashion such that one of second slots 118 is disposed circumferentially between two second tabs 116.

When first carbon ring 66 is axially stacked against second carbon ring 68, first tabs 112 of first carbon ring 66 extend axially into and mate with second slots 118 of second carbon ring 68. Similarly, second tabs 116 of second carbon ring 66 extend axially into and mate with first slots 114 of first carbon ring 66. With first tabs 112 mated with second slots 118, and second tabs 116 mated with first slots 114, first carbon ring 66 and second carbon ring 68 are interlocked with one another such that first carbon ring 66 and second carbon ring 68 do not rotate relative to one another about center axis CA more than a few degrees (e.g., ten degrees or less). When first carbon ring 66 is axially stacked and mated with second carbon ring 68, spring cavity 111 is positioned radially inward from both tabs 112 and 116, and radially inward from both slots 114 and 118.

As shown in FIGS. 3A-3C, first carbon ring 66 and second carbon ring 68 are completely symmetrical and identical. Thus, a manufacturer can produce second carbon ring 68 by manufacturing two copies of first carbon ring 66 and rotating one of the copies to mate the two copies together as first carbon ring 66 and second carbon ring 68. Because first carbon ring 66 and second carbon ring 68 are symmetrical, first tabs 112 and second tabs 116 are identically sized. First slots 114 and second slots 118 are also identically sized. Tabs 112 and 116 are circumferentially and axially smaller than slots 114 and 118 so as to ensure that tabs 112 and 116 mate with slots 114 and 118, respectively. As shown in FIG. 3C, first carbon ring 66 and second carbon ring 68 can each include additional features, such as radial grooves 120, axial grooves 122, and circumferential grooves 124. Radial grooves 120, axial grooves 122, and circumferential grooves 124 can direct cooling air that is plumbed into seal assembly 62 around first carbon ring 66 and second carbon ring 68 to help balance the air pressure across seal assembly 62. Balancing the air pressure across seal assembly 62 further helps to reduce non-uniform wear of first carbon ring 66 and second carbon ring 68. While FIG. 3C shows first carbon ring 66 and second carbon ring 68 having identical radial grooves 120, identical axial grooves 122, and identical circumferential grooves 124, alternative embodiments can include first carbon ring 66 with radial grooves, axial grooves, and circumferential grooves that are different from the grooves of second carbon ring 68.

In view of the foregoing description, it will be recognized that the present disclosure provides numerous advantages and benefits. For example, the present disclosure provides seal assembly 62 with first carbon ring 66 and second carbon ring 68 stacked together between front seat 70 and rear seat 72. First carbon ring 66 and second carbon ring 68 interlock with each other such that first carbon ring 66 and second carbon ring 68 do not rotate relative to one another and wear against one another. Reducing relative movement between first carbon ring 66 and second carbon ring 68 also reduces wear on spring 74 and any other hardware (i.e., spring washers) disposed between first carbon ring 66 and second carbon ring 68. Furthermore, first carbon ring 66 and second carbon ring 68 are symmetrical and identical to each other so that two copies of a single part can be used for both rings, thereby reducing manufacturing complexity and cost of seal assembly 62.

The following are non-exclusive descriptions of possible embodiments of the present invention.

In one embodiment, a carbon ring for a seal assembly in a gas turbine engine includes an outer face extending circumferentially around a center axis of the carbon ring. The carbon ring also includes an inner face extending around the center axis and disposed radially inward from the outer face. A forward face of the carbon ring extends radially between the inner face and the outer face. A rear face of the carbon ring extends radially between the inner face and the outer face and is disposed axially opposite the forward face. At least one tab extends axially from at least one of the forward face and the rear face.

The carbon ring of the preceding paragraph can optionally include, additionally and/or alternatively, any one or more of the following features, configurations and/or additional components:

the carbon ring further comprises at least one slot formed in at least one of the forward face and the rear face;

the at least one tab is formed on the rear face, the at least one slot is formed on the rear face, and the at least one tab is circumferentially smaller than the at least one slot; and/or the at least one tab is axially smaller than the at least one slot.

In another embodiment, a seal assembly includes a first carbon ring with a tab extending axially from the first carbon ring relative a center axis of the seal assembly. The seal assembly also includes a second carbon ring disposed adjacent to the first carbon ring and coaxial with the first carbon ring. The second carbon ring includes a slot that extends axially into the second carbon ring. The tab of the first carbon ring mates with the slot of the second carbon ring.

The seal assembly of the preceding paragraph can optionally include, additionally and/or alternatively, any one or more of the following features, configurations and/or additional components:

a front seat; and a rear seat disposed axially aft of the front seat, wherein the first carbon ring and the second carbon ring are both disposed axially between the front seat and the rear seat;

a spring disposed axially between the first carbon ring and the second carbon ring;

a cavity disposed between the first carbon ring and the second carbon ring, wherein the cavity is positioned radially inward from both the tab of the first carbon ring and the slot of the second carbon ring, and wherein the cavity extends axially into the first carbon ring and axially into the second carbon ring;

the spring is disposed inside the cavity, and wherein a first washer is disposed between the spring and the first carbon ring and a second washer is disposed between the spring and the second carbon ring the cavity extends completely around an inner circumference of the first carbon ring and the second carbon ring;

the first carbon ring and the second carbon ring are configured to rotate relative the front seat and the rear seat;

a liner extending circumferentially around the first carbon ring and the second carbon ring, wherein the first carbon ring and the second carbon ring are in contact with the liner and configured to rotate relative the liner;

the first carbon ring comprises a slot that extends axially into the first carbon ring, wherein the second carbon ring comprises a tab that extends axially from the second carbon ring, and wherein the tab of the second carbon ring mates with the slot of the first carbon ring; and/or the first carbon ring is symmetric with the second carbon ring.

In another embodiment, a seal assembly for a gas turbine engine includes an annular front seat positioned on a center axis of the seal assembly and an annular rear seat disposed axially aft of the annular front seat. A first carbon ring is positioned axially between the annular front seat and the annular rear seat. A second carbon ring is positioned axially between the first carbon ring and the annular rear seat. The first carbon ring rotationally interlocks with the second carbon ring.

The seal assembly of the preceding paragraph can optionally include, additionally and/or alternatively, any one or more of the following features, configurations and/or additional components:

the first carbon ring comprises a tab extending axially from the first carbon ring relative the center axis of the seal assembly, wherein the second carbon ring comprises a slot that extends axially into the second carbon ring, and wherein the tab of the first carbon ring mates with the slot of the second carbon ring;

the first carbon ring comprises a slot that extends axially into the first carbon ring, wherein the second carbon ring comprises a tab that extends axially from the second carbon ring, and wherein the tab of the second carbon ring mates with the slot of the first carbon ring; and/or the first carbon ring is symmetric with the second carbon ring.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A carbon ring for a seal assembly in a gas turbine engine, the carbon ring comprising:
   an outer face extending circumferentially around a center axis of the carbon ring;
   an inner face extending around the center axis and disposed radially inward from the outer face;
   a forward face that extends radially between the inner face and the outer face;
   a rear face that extends radially between the inner face and the outer face and disposed axially opposite the forward face;
   at least one tab extending axially from the rear face; and
   at least one slot formed on the rear face, and wherein the at least one tab is circumferentially smaller than the at least one slot.

2. The carbon ring of claim 1, wherein the at least one tab is axially smaller than the at least one slot.

3. A seal assembly comprising:
   a first carbon ring comprising a tab extending axially from the first carbon ring relative a center axis of the seal assembly;
   a second carbon ring disposed adjacent to the first carbon ring and coaxial with the first carbon ring, the second carbon ring comprising a slot that extends axially into the second carbon ring;
   wherein the tab of the first carbon ring mates with the slot of the second carbon ring.

4. The seal assembly of claim 3 further comprising:
   a front seat; and
   a rear seat disposed axially aft of the front seat,
   wherein the first carbon ring and the second carbon ring are both disposed axially between the front seat and the rear seat.

5. The seal assembly of claim 4 further comprising:
   a spring disposed axially between the first carbon ring and the second carbon ring.

6. The seal assembly of claim 5 further comprising:
   a cavity disposed between the first carbon ring and the second carbon ring, wherein the cavity is positioned radially inward from both the tab of the first carbon ring and the slot of the second carbon ring, and wherein the cavity extends axially into the first carbon ring and axially into the second carbon ring.

7. The seal assembly of claim 6, wherein the spring is disposed inside the cavity, and wherein a first washer is disposed between the spring and the first carbon ring and a second washer is disposed between the spring and the second carbon ring.

8. The seal assembly of claim 7, wherein the cavity extends completely around an inner circumference of the first carbon ring and the second carbon ring.

9. The seal assembly of claim 8, wherein the first carbon ring is symmetric with the second carbon ring.

10. The seal assembly of claim 5, wherein the first carbon ring and the second carbon ring are configured to rotate relative the front seat and the rear seat.

11. The seal assembly of claim 10 further comprising:
    a liner extending circumferentially around the first carbon ring and the second carbon ring, wherein the first carbon ring and the second carbon ring are in contact with the liner and configured to rotate relative the liner.

12. The seal assembly of claim 3, wherein the first carbon ring comprises a slot that extends axially into the first carbon ring, wherein the second carbon ring comprises a tab that extends axially from the second carbon ring, and wherein the tab of the second carbon ring mates with the slot of the first carbon ring.

13. A seal assembly for a gas turbine engine, wherein the seal assembly comprises:
 an annular front seat positioned on a center axis of the seal assembly;
 an annular rear seat disposed axially aft of the annular front seat;
 a first carbon ring positioned axially between the annular front seat and the annular rear seat;
 a second carbon ring positioned axially between the first carbon ring and the annular rear seat; and
 wherein the first carbon ring rotationally interlocks with the second carbon ring.

14. The seal assembly of claim 13, wherein the first carbon ring comprises a tab extending axially from the first carbon ring relative the center axis of the seal assembly, wherein the second carbon ring comprises a slot that extends axially into the second carbon ring, and wherein the tab of the first carbon ring mates with the slot of the second carbon ring.

15. The seal assembly of claim 14, wherein the first carbon ring comprises a slot that extends axially into the first carbon ring, wherein the second carbon ring comprises a tab that extends axially from the second carbon ring, and wherein the tab of the second carbon ring mates with the slot of the first carbon ring.

16. The seal assembly of claim 15, wherein the first carbon ring is symmetric with the second carbon ring.

* * * * *